US012405871B2

United States Patent
Peng et al.

(10) Patent No.: US 12,405,871 B2
(45) Date of Patent: Sep. 2, 2025

(54) PASSWORD CHANGE VIA DYNAMIC POWER RESET PATTERN

(71) Applicant: Ruckus IP Holdings LLC, Claremont, NC (US)

(72) Inventors: Xing Peng, Shenzhen (CN); Zhineng Cui, San Ramon, CA (US); Jilu Sun, Shenzhen (CN); Yujie Zhou, Shenzhen (CN); Wenjun Ji, Shenzhen (CN); Tyan-Shu Jou, Fremont, CA (US)

(73) Assignee: ASSIONE IP HOLDINGS LLC, Claremont, NC (US)

( * ) Notice: Subject to any disclaimer, the term of this patent is extended or adjusted under 35 U.S.C. 154(b) by 75 days.

(21) Appl. No.: 18/476,706

(22) Filed: Sep. 28, 2023

(65) Prior Publication Data
US 2024/0111650 A1    Apr. 4, 2024

Related U.S. Application Data

(60) Provisional application No. 63/411,221, filed on Sep. 29, 2022.

(51) Int. Cl.
  *G06F 11/30*    (2006.01)
  *G06F 1/24*    (2006.01)
(52) U.S. Cl.
  CPC .......... *G06F 11/3072* (2013.01); *G06F 1/24* (2013.01)
(58) Field of Classification Search
  CPC ..... G06F 11/3072; G06F 11/3075; G06F 1/24
  See application file for complete search history.

(56) References Cited

U.S. PATENT DOCUMENTS

| 2011/0179293 | A1* | 7/2011 | Ma | G06F 1/24 |
| | | | | 713/310 |
| 2011/0208268 | A1* | 8/2011 | Brown | A61N 1/37254 |
| | | | | 607/60 |
| 2016/0373258 | A1* | 12/2016 | Bone | G06F 21/575 |
| 2022/0247660 | A1* | 8/2022 | Sampat | H04L 43/0864 |

FOREIGN PATENT DOCUMENTS

CN      105930247 A  *  9/2016  .......... G06F 11/3051

* cited by examiner

*Primary Examiner* — Jonathan A Bui
(74) *Attorney, Agent, or Firm* — Steven Stupp (57) ABSTRACT

During operation, an electronic device may receive, associated with a computer, a packet or a frame that includes a dynamic power reset pattern, where the dynamic power reset pattern specifies temporal pattern of power resets. Then, the electronic device may detect multiple power resets, where a given detected power reset in the detected power resets involves activation of a power reset button in the electronic device. Moreover, the electronic device may compute a detected power reset pattern, where the detected power reset pattern includes a detected temporal pattern of detected power resets. Next, the electronic device may compare the dynamic power reset pattern and the detected power reset pattern. Furthermore, based at least in part on a result of the comparison, the electronic device may at least selectively provide, to the computer, the result of the comparison.

20 Claims, 7 Drawing Sheets

PASSWORD CHANGE VIA DYNAMIC POWER RESET PATTERN

CROSS REFERENCE TO RELATED APPLICATIONS

This application claims priority under 35 U.S.C. 119(e) to U.S. Provisional Application Ser. No. 63/411,221, "Password Change via Dynamic Power Reset Pattern," filed on Sep. 29, 2022, by Xing Peng, et al. the contents of which are herein incorporated by reference.

FIELD

The described embodiments relate to techniques for changing a password associated with an electronic device. Notably, the described embodiments relate to techniques for changing a password associated with an electronic device based at least in part on performing of a dynamic power reset pattern.

BACKGROUND

Many electronic devices are capable of wirelessly communicating with other electronic devices. For example, these electronic devices can include a networking subsystem that implements a network interface for a wireless local area network (WLAN), e.g., a wireless network such as described in the Institute of Electrical and Electronics Engineers (IEEE) 802.11 standard. For example, a wireless network may include an access point that communicates wirelessly with one or more associated electronic devices (which are sometimes referred to as 'clients').

After deployment or installation, it is sometimes necessary to change a password of an electronic device, such as an access point. For example, a user may forget the password of an electronic device.

However, it can be difficult for a user to reset the password of an electronic device. Notably, many electronic devices do not have a user interface (which is sometimes referred to as a 'headless' electronic device), which may limit the information that the user can provide directly to the electronic device. Furthermore, while there may be a password recovery feature (such as one or more predefined answers to one or more security questions) available for a particular electronic device, a user may also be unable to use the password recovery feature (e.g., the user may also have forgotten the one or more predefined answers to the one or more security questions).

SUMMARY

An electronic device that confirms a physical presence of a user in proximity to the electronic device is described. This electronic device may include: a power reset button; and an interface circuit that communicates with a computer (or a computer system). During operation, the electronic device receives, associated with the computer, a packet or a frame that includes a dynamic power reset pattern, where the dynamic power reset pattern specifies a predefined number of power resets and associated predefined time intervals between pairs of power resets. Then, the electronic device detects multiple power resets, where a given detected power reset in the detected power resets involves activation of the power reset button. Moreover, the electronic device computes a detected power reset pattern, where the detected power reset pattern includes a number of detected power resets and associated time intervals between pairs of detected power resets. Next, the electronic device compares the dynamic power reset pattern and the detected power reset pattern. Furthermore, based at least in part on a result of the comparison, the electronic device may at least selectively provide, to the computer, the result of the comparison.

Note that the result of the comparison may be provided when the dynamic power reset pattern matches the detected power reset pattern. Moreover, when the dynamic power reset pattern matches the detected power reset pattern, the physical presence of the user in proximity to the electronic device is confirmed.

Furthermore, the dynamic power reset pattern may be associated with the user and/or with the electronic device. Alternatively or additionally, the dynamic power reset pattern may be valid during a time interval.

In some embodiments, the electronic device may include: an access point, a controller, a router, a switch, or another type of computer network device.

Moreover, the predefined number of power resets may include three power resets and the associated predefined time intervals may each be less than 30 s.

Furthermore, the electronic device may be a headless electronic device that does not include a user interface.

Another embodiment provides the second electronic device that performs a password reset of a password associated with the electronic device. The second electronic device includes a second interface circuit that communicates with the computer. During operation, the second electronic device provides, addressed to the computer, a request to reset the password associated with the electronic device. Then, the second electronic device receives, associated with the computer, a request for an identifier of the electronic device (such as a serial number) and an optional second identifier of a user. In response, the second electronic device provides, addressed to the computer, the identifier and the second identifier. Moreover, the second electronic device receives, associated with the computer, a dynamic power reset pattern and an optional instruction to perform the dynamic power reset pattern on the electronic device, where the dynamic power reset pattern specifies a predefined number of power resets and associated predefined time intervals between pairs of power resets. Next, the second electronic device provides or presents the dynamic power reset pattern and the instruction to perform the dynamic power reset pattern on the electronic device. Furthermore, the second electronic device optionally receives, associated with the computer, a location (such as a web page or a web site) where the password reset is performed. Additionally, the second electronic device accesses the location and performs the password reset.

Another embodiment provides the computer. The computer includes a third interface circuit that communicates with the electronic device and the second electronic device. During operation, the computer receives, associated with the second electronic device, a request to reset the password associated with the electronic device. In response, the computer provides, addressed to the second electronic device, a request for an identifier of the electronic device and the optional second identifier of the user. Then, the computer receives, associated with the second electronic device, the identifier of the electronic device and the optional second identifier of the user. After confirming the identifier and the optional second identifier, the computer provides, addressed to the second electronic device, the dynamic power reset pattern and the optional instruction to perform the dynamic power reset pattern on the electronic device. Moreover, the computer provides, addressed to the electronic device, the dynamic power reset pattern. Next, the computer receives, associated with the electronic device, the result of the comparison. Furthermore, based at least in part on a result of the comparison, the computer selectively provides, addressed to the second electronic device, the location where the password reset is performed or enables access to the location where the password reset is performed.

Another embodiment provides a computer-readable storage medium for use with the electronic device, the second electronic device or the computer. When executed by the electronic device, the second electronic device or the computer, this computer-readable storage medium causes the electronic device, the second electronic device or the computer to perform at least some of the aforementioned operations.

Another embodiment provides a method, which may be performed by the electronic device, the second electronic device or the computer. This method includes at least some of the aforementioned operations.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

An electronic device that confirms a physical presence of a user in proximity to the electronic device is described.

During operation, the electronic device may receive, associated with a computer, a packet or a frame that includes a dynamic power reset pattern, where the dynamic power reset pattern specifies a temporal pattern of power resets, such as a predefined number of power resets and associated predefined time intervals between pairs of power resets. Then, the electronic device may detect multiple power resets, where a given detected power reset in the detected power resets involves activation of a power reset button in the electronic device. Moreover, the electronic device may compute a detected power reset pattern, where the detected power reset pattern includes a detected temporal pattern of detected power resets, such as a number of detected power resets and associated time intervals between pairs of detected power resets. Next, the electronic device may compare the dynamic power reset pattern and the detected power reset pattern. Furthermore, based at least in part on a result of the comparison, the electronic device may at least selectively provide, to the computer, the result of the comparison.

Another embodiment provides a second electronic device that performs a password reset of a password associated with the electronic device. During operation, the second electronic device may provide, addressed to a computer, a request to reset the password associated with the electronic device. Then, the second electronic device may receive, associated with the computer, a request for an identifier of the electronic device (such as a serial number) and an optional second identifier of a user. In response, the second electronic device may provide, addressed to the computer, the identifier and the second identifier. Moreover, the second electronic device may receive, associated with the computer, a dynamic power reset pattern and an optional instruction to perform the dynamic power reset pattern on the electronic device, where the dynamic power reset pattern specifies a predefined number of power resets and associated predefined time intervals between pairs of power resets. Next, the second electronic device may provide or present the dynamic power reset pattern and the instruction to perform the dynamic power reset pattern on the electronic device. Furthermore, the second electronic device may optionally receive, associated with the computer, a location (such as a web page or a web site) where the password reset is performed. additionally, the second electronic device may access the location and may perform the password reset.

Another embodiment provides the computer. During operation, the computer may receive, associated with the second electronic device, a request to reset the password associated with the electronic device. In response, the computer may provide, addressed to the second electronic device, a request for an identifier of the electronic device and the optional second identifier of the user. Then, the computer may receive, associated with the second electronic device, the identifier of the electronic device and the optional second identifier of the user. After confirming the identifier and the optional second identifier, the computer may provide, addressed to the second electronic device, the dynamic power reset pattern and the optional instruction to perform the dynamic power reset pattern on the electronic device, where the dynamic power reset pattern specifies a predefined number of power resets and associated predefined time intervals between pairs of power resets. Moreover, the computer may provide, addressed to the electronic device, the dynamic power reset pattern. Next, the computer may receive, associated with the electronic device, the result of the comparison. Furthermore, based at least in part on a result of the comparison, the computer may selectively provide, addressed to the second electronic device, the location where the password reset is performed or may enable access to the location where the password reset is performed.

By performing at least some of the aforementioned operations, these communication techniques may allow the password of the electronic device to be reset. Notably, the password may be reset even when the electronic device is a headless electronic device and/or when the user has forgotten a password rest procedure (such as one or more pre-defined answers to one or more security questions). Moreover, the communication techniques may allow the physical presence of the user in proximity to the electronic device to be confirmed, thereby authenticating the user. Consequently, the communication techniques may facilitate ease of use of the electronic device and may improve the overall user experience.

In the discussion that follows, an access point is used as an illustration of the electronic device, a cloud-based computer or computer system (which includes one or more computer, such as the computer) is used as an illustration of the computer, and a second computer or a cellular telephone is used as an illustration of the second electronic device. However, in other embodiments, the electronic device may include: a controller, a router, a switch, another type of computer network device, or another type of electronic device. Note that the cloud-based computer may include a controller of the access point and/or a computer that provides analytical services to the access point.

The access point and the second electronic device may communicate packets or frames in accordance with a wireless communication protocol, such as an Institute of Electrical and Electronics Engineers (IEEE) 802.11 standard (which is sometimes referred to as 'Wi-Fi,' from the Wi-Fi Alliance of Austin, Texas), Bluetooth (from the Bluetooth Special Interest Group of Kirkland, Washington), and/or another type of wireless interface. For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. In the discussion that follows, Wi-Fi is used as an illustrative example. However, a wide variety of communication protocols (such as Long Term Evolution or LTE, another cellular-telephone communication protocol, etc.) may be used. The wireless communication may occur in one or more bands of frequencies, such as: a 900 MHz, a 2.4 GHz, a 5 GHz, 6 GHz, the Citizens Broadband Radio Spectrum or CBRS (e.g., a frequency band near 3.5 GHz), a band of frequencies used by LTE or another cellular-telephone communication protocol or a data communication protocol, and/or a 60 GHz frequency band. (Note that IEEE 802.11ad communication over a 60 GHz frequency band is sometimes referred to as 'WiGig.' In the present discussion, these embodiments also encompassed by 'Wi-Fi.') In some embodiments, communication with or by the access point and/or the second electronic device may use multi-user transmission (such as orthogonal frequency division multiple access or OFDMA) and/or multiple input multiple output (MIMO).

Moreover, the access point may communicate with other access points and/or the computer in a network using a wired communication protocol, such as an IEEE 802.3 standard (which is sometimes referred to as 'Ethernet') and/or another type of wired interface. In the discussion that follows, Ethernet is used as an illustrative example.

Figure 1:
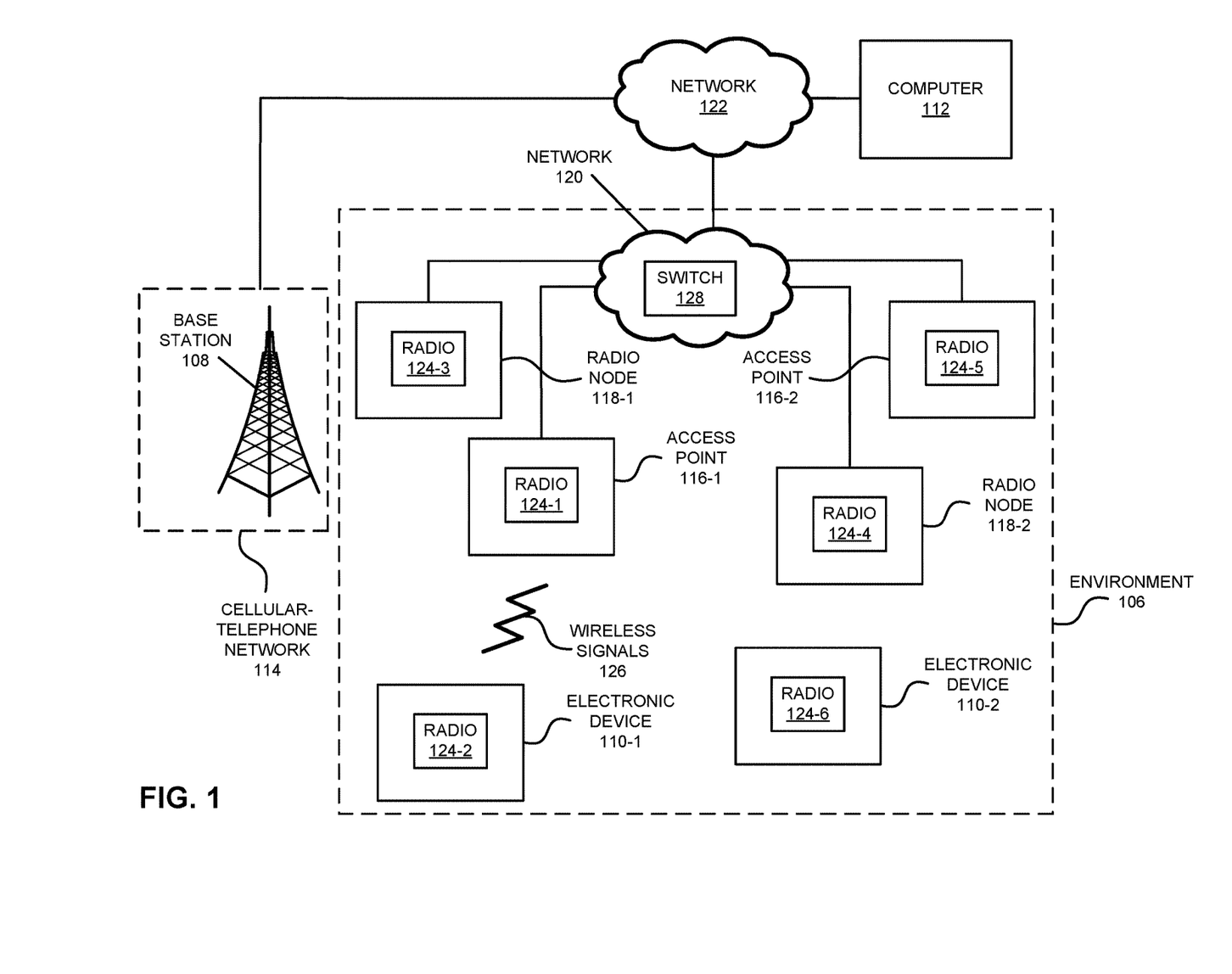
FIG. 1 is a block diagram illustrating an example of communication among electronic devices in accordance with an embodiment of the present disclosure.

We now describe some embodiments of the communication techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a wireless local area network (WLAN) and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other, computer 112 (which may be a local or a cloud-based controller that manages and/or configures access points 116, radio nodes 118 and/or switch 128, or that provides cloud-based storage and/or analytical services) using a wired communication protocol (such as Ethernet) via network 120 and/or 122. Note that networks 120 and 122 may be the same or different networks. For example, networks 120 and/or 122 may an LAN, an intra-net or the Internet. In some embodiments, network 120 may include one or more routers and/or switches (such as switch 128).

Moreover, note that computer 112 may be at the same location as the other components in FIG. 1 or may be located remotely (i.e., at a different location). Furthermore, note that the one or more access points 116 and/or the one or more radio nodes 118 may be managed and/or configured by computer 112.

Figure 7:
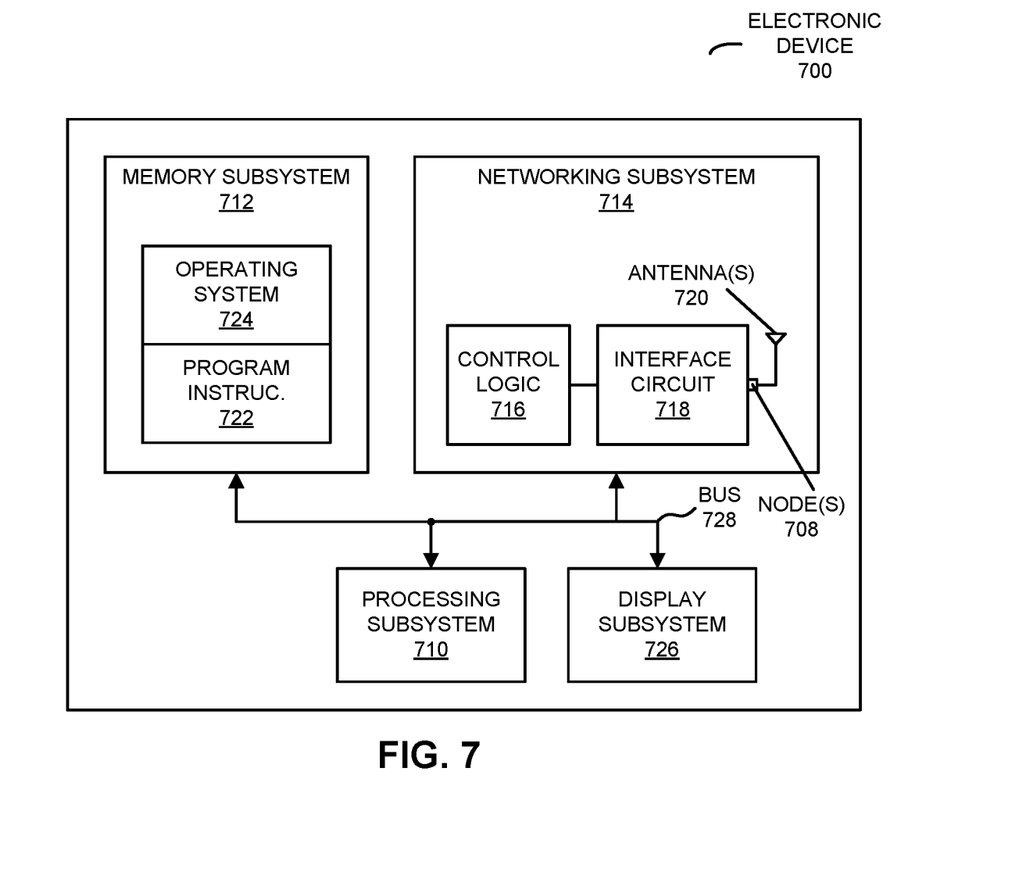
FIG. 7 is a block diagram illustrating an electronic device in accordance with an embodiment of the present disclosure.

As described further below with reference to FIG. 7, electronic devices 110, computer 112, access points 116, radio nodes 118 and switch 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, it can be difficult to reset a password of one of access points 116 (such as access point 116-1). In order to address these challenges, access point 116-1, one of electronic devices 110 (such as electronic device 110-1) and computer 112 may perform the communication techniques according to embodiments of the present disclosure. Notably, as discussed further below with reference to FIGS. 2-6, during the communication techniques when a user forgets the password of or associated with access point 116-1, the user may instruct electronic device 110-1 to provide a request to reset the password to computer 112. In response, computer 112 may provide, to electronic device 110-1, a request for an identifier of access point 116-1 (such as a serial number) and an optional second identifier of a user (such as a user identifier, e.g., an employee number, a telephone number, etc.). Then, the user may instruct electronic device 110-1 to provide, to computer 112, the identifier of access point 116-1 and the optional second identifier of the user.

After receiving the identifier of access point 116-1 and the optional second identifier of the user, computer 112 may compare the identifier of access point 116-1 and the optional second identifier of the user with stored information in memory in or associated with computer 112. When there is a match (such as when the identifier and the optional second identifier match the stored information), computer 112 may provide, to electronic device 110-1, a dynamic power reset pattern and an optional instruction to perform the dynamic power reset pattern on access point 116-1, where the dynamic power reset pattern specifies a predefined number of power resets of access point 116-1 and associated predefined time intervals between pairs of power resets. Note that a given power reset may include or may involve activating or pressing and holding down a power reset button or icon (such as a virtual icon on a touch-sensitive display) on access point 116-1 for a predefined amount of time, such as 30 s.

For example, computer 112 may generate the dynamic power reset pattern (such as a random or a pseudorandom power reset pattern). Alternatively, the dynamic power reset pattern may be predefined or predetermined and computer 112 may select the dynamic power reset pattern. In some embodiments, the dynamic power reset pattern is associated with access point 116-1 and/or the user. Note that the dynamic power reset pattern may be valid during a time interval, such a subsequent 1, 5 or 10 min, or a time interval corresponding to the dynamic power reset pattern (such as the predefined number of power resets and the associated predefined time intervals).

Furthermore, computer 112 may provide, to access point 116-1, the dynamic power reset pattern.

Additionally, after receiving the dynamic power reset pattern and the optional instruction, electronic device 110-1 may provide or present (e.g., on a display in electronic device 110-1) the dynamic power reset pattern and the instruction to perform the dynamic power reset pattern on access point 116-1. Then, the user may perform the dynamic power reset pattern by repeatedly pressing or activating the power reset button on access point 116-1.

Next, access point 116-1 may detect multiple power resets, where a given detected power reset in the detected power resets involves activation of the power reset button. Moreover, access point 116-1 may compute a detected power reset pattern, where the detected power reset pattern includes a number of detected power resets and associated time intervals between pairs of detected power resets. Furthermore, access point 116-1 may compare the dynamic power reset pattern and the detected power reset pattern. When the dynamic power reset pattern and the detected power reset pattern match (e.g., the temporal power reset patterns include a same number of power resets and the time intervals match within 5, 10, 15 or 25% of each other or are less than a threshold value), access point 116-1 may provide, to computer 112, a result of the comparison, such as an indication that the dynamic power reset pattern and the detected power reset pattern match or agree with each other.

Additionally, after receiving the result of the comparison, and when the dynamic power reset pattern and the detected power reset pattern match or agree with each other (which may confirm the physical presence of the user in proximity to access point 116-1), computer 112 may provide, to electronic device 110-1, a location where the password reset is performed (such as a web page or a web site) or may enable access to the location where the password reset is performed. Moreover, after optionally receiving the location or when the access to the location is enabled, electronic device 110-1 accesses the location. Next, the user may use electronic device 110-1 to perform the password reset.

In these ways, the communication techniques may allow the password of access point 116-1 to be reset. Notably, the password may be reset even when access point 116-1 is a headless electronic device and/or when the user has forgotten a password rest procedure (such as one or more predefined answers to one or more security questions). Moreover, the communication techniques may allow the physical presence of the user in proximity to access point 116-1 to be confirmed, thereby authenticating the user. Consequently, the communication techniques may facilitate ease of use of access point 116-1 (or may reduce user frustration) and may improve the overall user experience.

Moreover, while the preceding discussion illustrated access point 116-1, electronic device 110-1 and computer 112 performing particular operations in the communication techniques, in other embodiments one or more of the operations may be performed by a different one of access point 116-1, electronic device 110-1 and computer 112. For example, instead of access point 116-1 performing the comparison operation, access point 116-1 may provide the detected power reset pattern to computer 112, which may perform the comparison operation.

Figure 2:
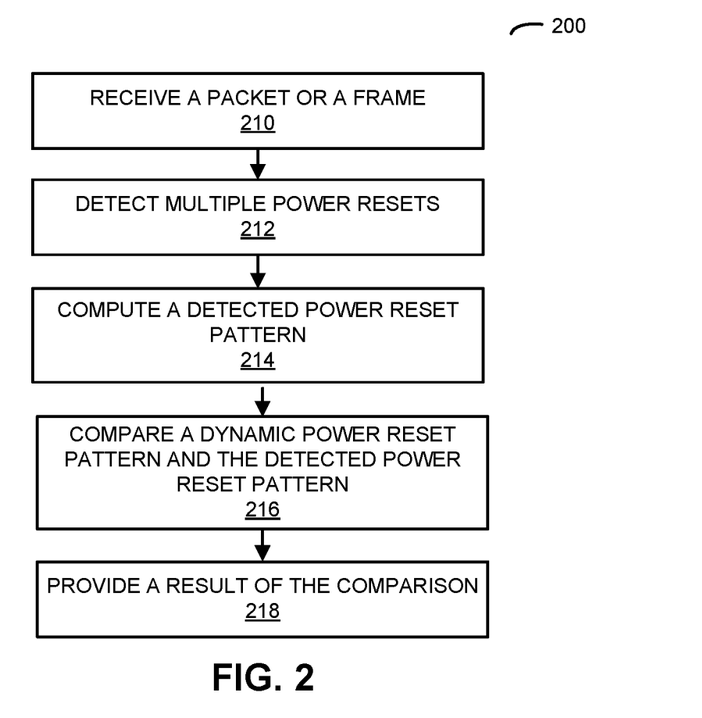
FIG. 2 is a flow diagram illustrating an example method for confirming a physical presence of a user in proximity to an electronic device in FIG. 1 in accordance with an embodiment of the present disclosure.

We now describe embodiments of the methods. FIG. 2 presents a flow diagram illustrating an example of a method 200 for confirming a physical presence of a user in proximity to an electronic device, which may be performed by the electronic device, such as access point 116-1 in FIG. 1. During operation, the electronic device may receive, associated with a computer, a packet or a frame (operation 210) that includes a dynamic power reset pattern, where the dynamic power reset pattern specifies a predefined number of power resets and associated predefined time intervals between pairs of power resets. For example, the predefined number of power resets may include three power resets and the associated predefined time intervals may each be less than 30 s.

Then, the electronic device may detect multiple power resets (operation 212), where a given detected power reset in the detected power resets involves activation of a power reset button in the electronic device. Moreover, the electronic device may compute a detected power reset pattern (operation 214), where the detected power reset pattern includes a number of detected power resets and associated time intervals between pairs of detected power resets. For example, the electronic device may compute a temporal pattern of the detected power resets based at least in part on the number of detected power resets and the associated time intervals. Next, the electronic device may compare the dynamic power reset pattern and the detected power reset pattern (operation 216).

Furthermore, based at least in part on a result of the comparison, the electronic device may at least selectively provide, to the computer, the result of the comparison (operation 218). For example, the result of the comparison may be provided when the dynamic power reset pattern matches the detected power reset pattern. Moreover, when the dynamic power reset pattern matches the detected power reset pattern, the physical presence of the user in proximity to the electronic device is confirmed.

Note that the dynamic power reset pattern may be associated with the user and/or with the electronic device.

Alternatively or additionally, the dynamic power reset pattern may be valid during a time interval.

In some embodiments, the electronic device may include: an access point, a controller, a router, a switch, or another type of computer network device.

Furthermore, the electronic device may be a headless electronic device that does not include a user interface.

Figure 3:
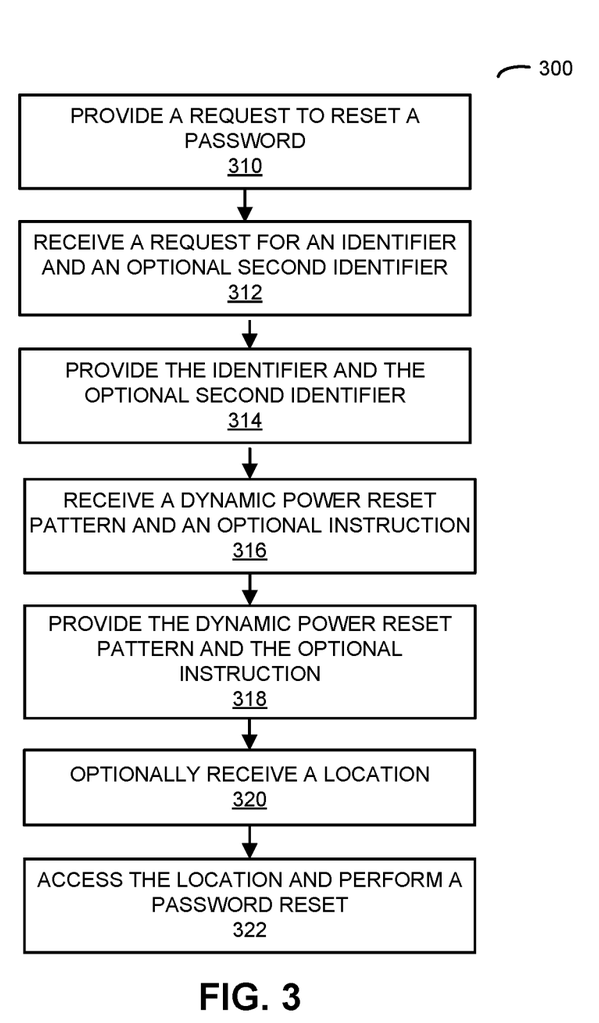
FIG. 3 is a flow diagram illustrating an example method for performing a reset of a password associated with an electronic device in FIG. 1 in accordance with an embodiment of the present disclosure.

FIG. 3 presents a flow diagram illustrating an example method 300 for performing a reset of a password associated with the electronic device, which may be performed by a second electronic device, such as electronic device 110-1 in FIG. 1. During operation, the second electronic device may provide, addressed to a computer, a request to reset the password (operation 310) associated with the electronic device. Then, the second electronic device may receive, associated with the computer, a request for an identifier of the electronic device (such as a serial number) and an optional second identifier of a user (operation 312). In response, the second electronic device may provide, addressed to the computer, the identifier and the second identifier (operation 314). Moreover, the second electronic device may receive, associated with the computer, a dynamic power reset pattern and an optional instruction (operation 316) to perform the dynamic power reset pattern on the electronic device, where the dynamic power reset pattern specifies a predefined number of power resets and associated predefined time intervals between pairs of power resets. Next, the second electronic device may provide or present the dynamic power reset pattern and the instruction (operation 318) to perform the dynamic power reset pattern on the electronic device. Furthermore, the second electronic device may optionally receive, associated with the computer, a location (operation 320) where the password reset is performed. Additionally, the second electronic device may access the location and may perform the password reset (operation 322).

Figure 4:
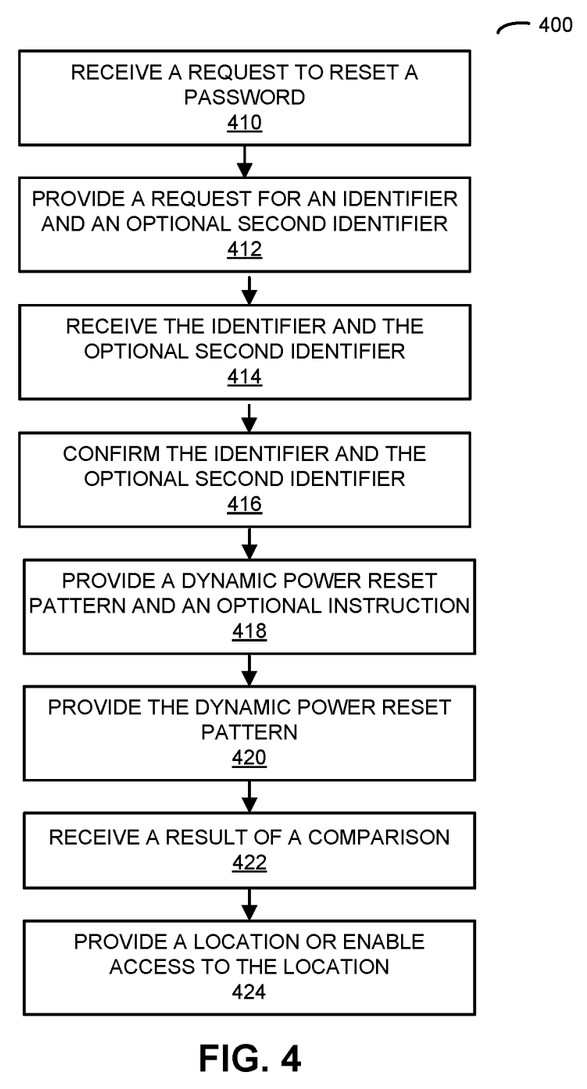
FIG. 4 is a flow diagram illustrating an example method for selectively providing a location or access to a location where a password reset is performed of a password associated with an electronic device in FIG. 1 in accordance with an embodiment of the present disclosure.

FIG. 4 presents a flow diagram illustrating an example method 400 for selectively providing a location or access to a location where a password reset is performed of a password associated with an electronic device, which may be performed by a computer or a computer system, such as computer 112 in FIG. 1. During operation, the computer may receive, associated with a second electronic device, a request to reset a password (operation 410) associated with an electronic device. In response, the computer may provide, addressed to the second electronic device, a request for an identifier of the electronic device and the optional second identifier of the user (operation 412). Then, the computer may receive, associated with the second electronic device, the identifier of the electronic device and the optional second identifier of the user (operation 414). After confirming the identifier and the optional second identifier (operation 416), the computer may provide, addressed to the second electronic device, a dynamic power reset pattern and an optional instruction (operation 418) to perform the dynamic power reset pattern on the electronic device, where the dynamic power reset pattern specifies a predefined number of power resets and associated predefined time intervals between pairs of power resets. Moreover, the computer may provide, addressed to the electronic device, the dynamic power reset pattern (operation 420). Next, the computer may receive, associated with the electronic device, a result of a comparison (operation 422). Furthermore, based at least in part on a result of the comparison, the computer may optionally and selectively provide, addressed to the second electronic device, the location where the password reset is performed (operation 424) or may enable access to the location where the password reset is performed (operation 424).

Figure 5:
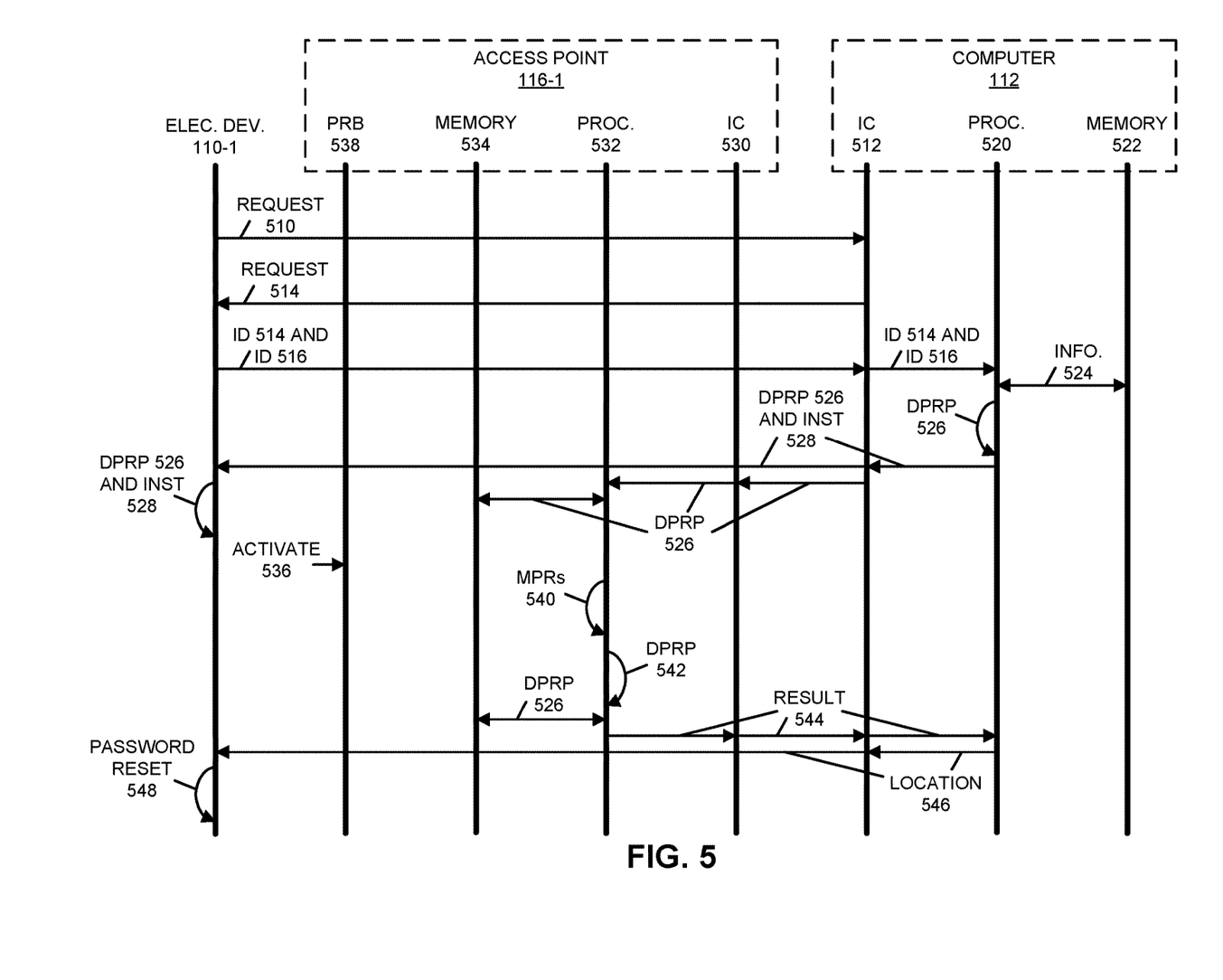
FIG. 5 is a drawing illustrating an example of communication among the electronic devices in FIG. 1 in accordance with an embodiment of the present disclosure.

FIG. 5 presents a drawing illustrating an example of communication among computer 112, access point 116-1 and electronic device 110-1. When a user forgets a password of or associated with access point 116-1, the user may instruct electronic device 110-1 to provide a request 510 to reset the password to computer 112. In response, an interface circuit (IC) 512 in computer 112 may provide, to electronic device 110-1, a request 514 for an identifier 516 of access point 116-1 and an optional identifier 518 of a user. Then, the user may instruct electronic device 110-1 to provide, to computer 112, identifier (ID) 514 of access point 116-1 and the optional identifier 516 of the user.

After receiving identifier 516 of access point 116-1 and the optional identifier 518 of the user, interface circuit 512 may provide this information to processor 520 in computer 112, which may compare the identifier of access point 116-1 and the optional second identifier of the user with stored information 524 in memory 522 in or associated with computer 112. When there is a match (such as when identifier 516 and the optional identifier 518 match the stored information 524), processor 520 may generate and may provide to electronic device 110-1, via interface circuit 512, a dynamic power reset pattern (DPRP) 526 and an optional instruction (INST) 528 to perform dynamic power reset pattern 526 on access point 116-1, where the dynamic power reset pattern specifies a predefined number of power resets of access point 116-1 and associated predefined time intervals between pairs of power resets.

Furthermore, processor 520 may provide to access point 116-1, via interface circuit 512, dynamic power reset pattern 526. After receiving dynamic power reset pattern 526, an interface circuit 530 in access point 116-1 may provide dynamic power reset pattern 526 to processor 532 in access point 116-1, which may store dynamic power reset pattern 526 in memory 534 in or associated with access point 116-1.

After receiving dynamic power reset pattern 526 and the optional instruction 528, electronic device 110-1 may provide or present (e.g., on a display in electronic device 110-1) dynamic power reset pattern 526 and instruction 528 to perform dynamic power reset pattern 526 on access point 116-1. Then, the user may perform dynamic power reset pattern 526 by repeatedly pressing or activating 536 a power reset button (PRB) 538 or icon (such as a virtual icon on a touch-sensitive display) on access point 116-1.

Next, processor 532 may detect multiple power resets (MPRs) 540, where a given detected power reset in the detected power resets involves activation of power reset button 538. Moreover, processor 532 may compute a detected power reset pattern (DPRP) 542, where the detected power reset pattern includes a number of detected power resets 540 and associated time intervals between pairs of detected power resets. Furthermore, processor 532 may compare dynamic power reset pattern 526 and detected power reset pattern (DPRP) 542 (which may include accessing the stored dynamic power reset pattern 526 in memory 534). When dynamic power reset pattern 526 and detected power reset pattern match 542, processor 532 may provide to computer 112, via interface circuit 530, a result 544 of the comparison, such as an indication that dynamic power reset pattern 526 and detected power reset pattern 542 match or agree with each other.

After receiving result 544, interface circuit 512 may provide result 544 to processor 520. Then, when result 544 indicates that dynamic power reset pattern 526 and detected power reset pattern 542 match or agree with each other (which may confirm the physical presence of the user in proximity to access point 116-1), processor 520 may provide to electronic device 110-1, via interface circuit 512, a location 546 where the password reset is performed (such as a web page or a web site) or may enable access to location 546 where the password reset is performed.

Furthermore, after optionally receiving location 546 or when the access to location 546 is enabled, electronic device 110-1 accesses location 546. Next, the user may use electronic device 110-1 to perform password reset 548, such as changing the password of or associated with access point 116-1.

While FIG. 5 illustrates communication between components using unidirectional or bidirectional communication with lines having single arrows or double arrows, in general the communication in a given operation in this figure may involve unidirectional or bidirectional communication.

We now describe additional embodiments of the communication techniques. Users often forget passwords of electronic devices, especially when a user has never logged in for a long time. While some electronic devices have a password recovery feature to recover the password, e.g., by answering security questions, many users may skip this feature or may also forget the security question. In this situation, providing a technique to simply authenticate user and then reset a new password may be helpful.

In order to resolve this problem, the disclosed communication techniques provide a password-reset mechanism. Notably, a user may be verified based at least in part on a serial number of an electronic device and by using a particular power reset pattern to verify that the user has physical access to the electronic device before opening or enabling access by the user to an interactive password reset portal.

Note that, unlike many electronic devices that have keyboard or user-interface inputs, a computer network device (such as an access point) usually only has a power reset button or very few buttons. Therefore, the communication techniques make use of the existing button(s) to perform an action pattern that can be used to physically verify the user.

Figure 6:
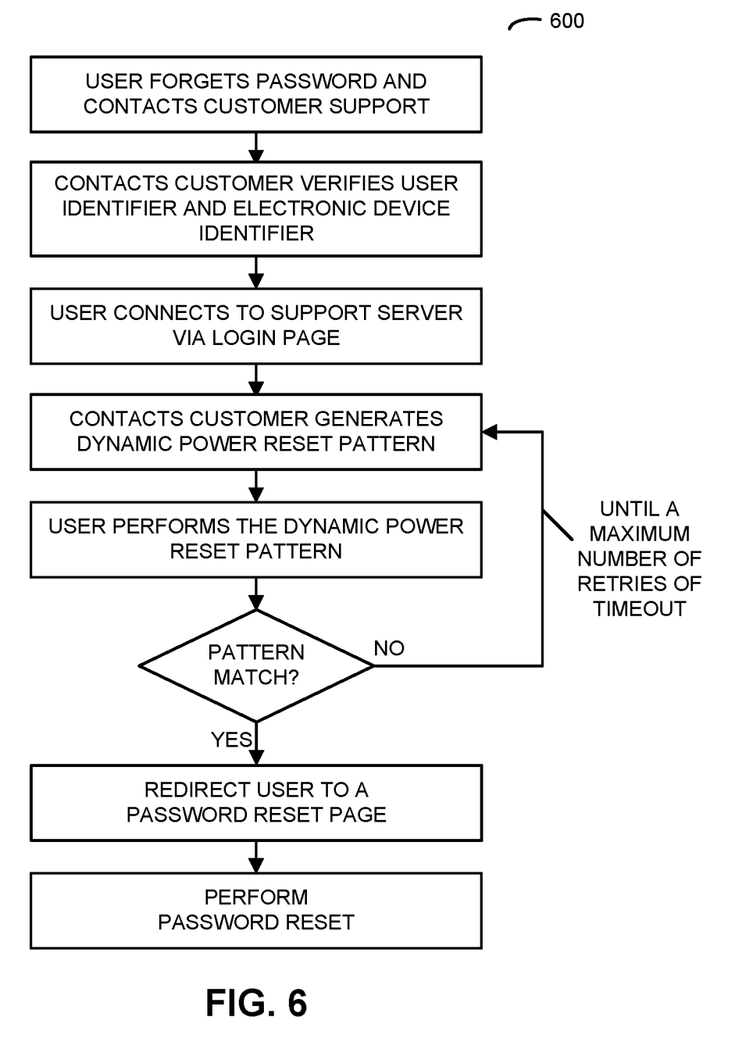
FIG. 6 is a flow diagram illustrating an example method for resetting a password associated with an electronic device in FIG. 1 in accordance with an embodiment of the present disclosure.

For example, as shown in FIG. 6, which presents a flow diagram illustrating an example method 600 for resetting a password associated with an electronic device (such as access point 116-1 in FIG. 1), when a user forgets the login credential (or password), they may contact or call customer support. In response, customer support may record an identity of the user and may ask for and verify a serial number of the electronic device. Then, customer support may ask the user to connect to a support server from a login page. Moreover, customer support may randomly choose a power reset pattern, such as reboot the electronic device three times and no longer than 30 s between each reboot. This power reset pattern may be sent to the electronic device. Furthermore, customer support may ask the user to conduct the power reset pattern. After the power reset pattern has been completed correctly, the user may be verified to have physical access to the electronic device. Next, the user may be redirected to a password reset page. Using the password reset page, the user may change the password. In some embodiment, the communication techniques are partially or completely automated.

In some embodiments of methods 200 (FIG. 2), 300 (FIG. 3), 400 (FIG. 4) and/or 600, there may be additional or fewer operations. Furthermore, the order of the operations may be changed, and/or two or more operations may be combined into a single operation.

We now describe embodiments of an electronic device, which may perform at least some of the operations in the communication techniques. For example, the electronic device may include: base station 108, one of electronic devices 110, computer 112, one of access points 116, one of radio nodes 118, or switch 128. FIG. 7 presents a block diagram illustrating an electronic device 700 in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, ASICs, microcontrollers, programmable-logic devices, graphical processor units (GPUs) and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), and/or other types of memory (which collectively or individually are sometimes referred to as a 'computer-readable storage medium'). In some embodiments, instructions for processing subsystem 710 in memory subsystem 712 include: one or more program modules or sets of instructions (such as program instructions 722 or operating system 724), which may be executed by processing subsystem 710. Note that the one or more computer programs may constitute a computer-program mechanism. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Networking subsystem 714 includes one or more devices configured to couple to and communicate on a wired and/or wireless network (i.e., to perform network operations), including: control logic 716, an interface circuit 718 and one or more antennas 720 (or antenna elements). (While FIG. 7 includes one or more antennas 720, in some embodiments electronic device 700 includes one or more nodes, such as nodes 708, e.g., a connector or a pad, which can be coupled to the one or more antennas 720. Thus, electronic device 700 may or may not include the one or more antennas 720.) For example, networking subsystem 714 can include a Bluetooth networking system, a cellular networking system (e.g., a 3G/4G/5G network such as UMTS, LTE, etc.), a USB networking system, a networking system based on the standards described in IEEE 802.11 (e.g., a Wi-Fi networking system), an Ethernet networking system, and/or another networking system.

In some embodiments, a transmit antenna radiation pattern of electronic device 700 may be adapted or changed using pattern shapers (such as reflectors) in one or more antennas 720 (or antenna elements), which can be independently and selectively electrically coupled to ground to steer the transmit antenna radiation pattern in different directions. Thus, if one or more antennas 720 includes N antenna-radiation-pattern shapers, the one or more antennas 720 may have $2^N$ different antenna-radiation-pattern configurations. More generally, a given antenna radiation pattern may include amplitudes and/or phases of signals that specify a direction of the main or primary lobe of the given antenna radiation pattern, as well as so-called 'exclusion regions' or 'exclusion zones' (which are sometimes referred to as 'notches' or 'nulls'). Note that an exclusion zone of the given antenna radiation pattern includes a low-intensity region of the given antenna radiation pattern. While the intensity is not necessarily zero in the exclusion zone, it may be below a threshold, such as 3 dB or lower than the peak gain of the given antenna radiation pattern. Thus, the given antenna radiation pattern may include a local maximum (e.g., a primary beam) that directs gain in the direction of an electronic device that is of interest, and one or more local minima that reduce gain in the direction of other electronic devices that are not of interest. In this way, the given antenna radiation pattern may be selected so that communication that is undesirable (such as with the other electronic devices) is avoided to reduce or eliminate adverse effects, such as interference or crosstalk.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting frames and/or scanning for frames transmitted by other electronic devices.

Within electronic device 700, processing subsystem 710, memory subsystem 712, and networking subsystem 714 are coupled together using bus 728. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc.

Electronic device 700 can be (or can be included in) any electronic device with at least one network interface. For example, electronic device 700 can be (or can be included in): a desktop computer, a laptop computer, a subnotebook/netbook, a server, a computer, a mainframe computer, a cloud-based computer, a tablet computer, a smartphone, a cellular telephone, a smartwatch, a wearable device, a consumer-electronic device, a portable computing device, an access point, a transceiver, a controller, a radio node, a router, a switch, communication equipment, a wireless dongle, test equipment, and/or another electronic device.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program instructions 722 are included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit' or a 'means for communication') may implement some or all of the functionality of networking subsystem 714 or electronic device 700. The integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII), Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 722, operating system 724 (such as a driver for interface circuit 718) or in firmware in interface circuit 718. Alternatively or additionally, at least some of the operations in the communication techniques may be implemented in a physical layer, such as hardware in interface circuit 718.

Additionally, while the preceding embodiments illustrated the use of wireless signals in one or more bands of frequencies, in other embodiments of these signals may be communicated in one or more bands of frequencies, including: a microwave frequency band, a radar frequency band, 900 MHz, 2.4 GHz, 5 GHz, 60 GHz, and/or a band of frequencies used by a Citizens Broadband Radio Service or by LTE. In some embodiments, the communication between electronic devices uses multi-user transmission (such as orthogonal frequency division multiple access or OFDMA).

In the preceding description, we refer to 'some embodiments.' Note that 'some embodiments' describes a subset of all of the possible embodiments, but does not always specify the same subset of embodiments. Moreover, note that numerical values in the preceding embodiments are illustrative examples of some embodiments. In other embodiments of the communication technique, different numerical values may be used.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
    a power reset button; and
    an interface circuit configured to communicate with a computer, and wherein the electronic device is configured to:
        receive, associated with the computer, a packet or a frame comprising a dynamic power reset pattern, wherein the dynamic power reset pattern specifies a predefined number of power resets and associated predefined time intervals between pairs of power resets;
        detect multiple power resets, wherein a given detected power reset in the detected power resets comprises activation of the power reset button;
        compute a detected power reset pattern, wherein the detected power reset pattern comprises a number of detected power resets and associated time intervals between pairs of detected power resets;
        compare the dynamic power reset pattern and the detected power reset pattern; and
        based at least in part on a result of the comparison, at least selectively provide, addressed to the computer, the result of the comparison.

2. The electronic device of claim 1, wherein the result of the comparison is provided when the dynamic power reset pattern matches the detected power reset pattern.

3. The electronic device of claim 1, wherein, when the dynamic power reset pattern matches the detected power reset pattern, a physical presence of a user in proximity to the electronic device is confirmed.

4. The electronic device of claim 1, wherein the dynamic power reset pattern is associated with a user or the electronic device.

5. The electronic device of claim 1, wherein the dynamic power reset pattern is valid during a time interval.

6. The electronic device of claim 1, wherein the electronic device comprises: an access point, a controller, a router, a switch, or another type of computer network device.

7. The electronic device of claim 1, wherein the predefined number of power resets comprises three power resets and the associated predefined time intervals are each be less than 30 s.

8. The electronic device of claim 1, wherein the electronic device comprises a headless electronic device that excludes a user interface.

9. A non-transitory computer-readable storage medium for use in conjunction with an electronic device, the computer-readable storage medium storing program instructions that, when executed by the electronic device, causes the electronic device to perform operations comprising:
    receiving, associated with a computer, a packet or a frame comprising a dynamic power reset pattern, wherein the dynamic power reset pattern specifies a predefined number of power resets and associated predefined time intervals between pairs of power resets;
    detecting multiple power resets, wherein a given detected power reset in the detected power resets comprises activation of a power reset button in the electronic device;
    computing a detected power reset pattern, wherein the detected power reset pattern comprises a number of detected power resets and associated time intervals between pairs of detected power resets;
    comparing the dynamic power reset pattern and the detected power reset pattern; and
    based at least in part on a result of the comparison, at least selectively providing, addressed to the computer, the result of the comparison.

10. The non-transitory computer-readable storage medium of claim 9, wherein the result of the comparison is provided when the dynamic power reset pattern matches the detected power reset pattern.

11. The non-transitory computer-readable storage medium of claim 9, wherein the dynamic power reset pattern is associated with a user or the electronic device.

12. The non-transitory computer-readable storage medium of claim 9, wherein the dynamic power reset pattern is valid during a time interval.

13. The non-transitory computer-readable storage medium of claim 9, wherein the electronic device comprises: an access point, a controller, a router, a switch, or another type of computer network device.

14. The non-transitory computer-readable storage medium of claim 9, wherein the electronic device comprises a headless electronic device that excludes a user interface.

15. A method for confirming a physical presence of a user in proximity to an electronic device, comprising:
    by an electronic device:
        receiving, associated with a computer, a packet or a frame comprising a dynamic power reset pattern, wherein the dynamic power reset pattern specifies a predefined number of power resets and associated predefined time intervals between pairs of power resets;
        detecting multiple power resets, wherein a given detected power reset in the detected power resets comprises activation of a power reset button in the electronic device;
        computing a detected power reset pattern, wherein the detected power reset pattern comprises a number of detected power resets and associated time intervals between pairs of detected power resets;
        comparing the dynamic power reset pattern and the detected power reset pattern; and
        based at least in part on a result of the comparison, at least selectively providing, addressed to the computer, the result of the comparison.

16. The method of claim 15, wherein the result of the comparison is provided when the dynamic power reset pattern matches the detected power reset pattern.

17. The method of claim 15, wherein the dynamic power reset pattern is associated with a user or the electronic device.

18. The method of claim 15, wherein the dynamic power reset pattern is valid during a time interval.

19. The method of claim 15, wherein the electronic device comprises: an access point, a controller, a router, a switch, or another type of computer network device.

20. The method of claim 15, wherein the electronic device comprises a headless electronic device that excludes a user interface.

* * * * *

UNITED STATES PATENT AND TRADEMARK OFFICE
CERTIFICATE OF CORRECTION

| | | |
|---|---|---|
| PATENT NO. | : 12,405,871 B2 | Page 1 of 1 |
| APPLICATION NO. | : 18/476706 | |
| DATED | : September 2, 2025 | |
| INVENTOR(S) | : Peng et al. | |

It is certified that error appears in the above-identified patent and that said Letters Patent is hereby corrected as shown below:

On the Title Page

Item (72) Inventors: Please correct "Yujie Zhou" to read --YuJie Zhou--

Item (73) Assignee: Please correct "ASSIONE IP HOLDINGS LLC" to read --Ruckus IP Holdings LLC--

Signed and Sealed this
Twenty-fifth Day of November, 2025

John A. Squires
*Director of the United States Patent and Trademark Office*